(12) United States Patent
Chiu et al.

(10) Patent No.: US 6,398,370 B1
(45) Date of Patent: Jun. 4, 2002

(54) LIGHT CONTROL DEVICE

(75) Inventors: Raymond C. Chiu; Gary E. Gaides, both of Woodbury; Paul E. Humpal, Stillwater, all of MN (US); Koichi Sano, Sagamihara (JP)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/713,066

(22) Filed: Nov. 15, 2000

(51) Int. Cl.⁷ ................................................ G02B 27/00
(52) U.S. Cl. .................. 359/613; 359/614; 359/601; 428/167; 428/172
(58) Field of Search ................................ 359/601, 614, 359/613; 428/168, 172, 201, 206, 207, 913, 163, 167

(56) References Cited

U.S. PATENT DOCUMENTS

| | | | |
|---|---|---|---|
| 4,342,821 A | * 8/1982 | Galves et al. | 430/12 |
| 4,553,818 A | 11/1985 | Cohen | |
| 4,621,898 A | 11/1986 | Cohen | |
| 4,764,410 A | 8/1988 | Grzywinski | |
| 4,766,023 A | 8/1988 | Lu | |
| 4,812,709 A | 3/1989 | Dudasik | |
| 5,061,029 A | 10/1991 | Ishikawa | |
| 5,136,678 A | 8/1992 | Yoshimura | |
| 5,147,716 A | 9/1992 | Bellus | |
| 5,204,160 A | 4/1993 | Rouser | |
| 5,254,388 A | 10/1993 | Melby et al. | |
| 5,528,319 A | 6/1996 | Austin | |
| 5,795,643 A | 8/1998 | Steininger et al. | |

* cited by examiner

Primary Examiner—Hung Xuan Dang
Assistant Examiner—Tuyen Tra
(74) Attorney, Agent, or Firm—Stephen W. Buckingham

(57) ABSTRACT

A light control device is disclosed that includes a two film construction, each film having a plurality of light absorbing regions. For example, the light absorbing elements can be a series of grooves or column-like indentations in the films that are filled or coated with a light absorbing material. The two films can be adjacently disposed so that their respective light absorbing regions form a plurality of light absorbing elements that extend along the thickness direction of the device. The light absorbing elements allow a viewer to view an image through the light control device within a range of viewing angles while blocking a view of the image outside that range of viewing angles. The two film construction allows for relative ease of manufacture as well as the ability to form light absorbing elements that can provide better viewing uniformity throughout a typical viewing range, a sharp privacy viewing cut off, and reduced ghost image formation.

18 Claims, 3 Drawing Sheets

LIGHT CONTROL DEVICE

The present invention pertains to light control devices that allow higher transmission over one range of viewing angles and lower transmission over another range of viewing angles.

BACKGROUND

Light control films, or light collimating films, are known in the art and have been made in various ways. One type of light control film includes alternating plastic layers of relatively high and relatively low optical density. The high optical density layers provide light-collimating louver elements. Louvered plastic light control films have been disclosed that have louvers having central regions withRelatively high coefficients of extinction and outer regions with lower coefficients of extinction. The presence of the lower coefficient regions can reduce the formation of ghost images due to glancing angle reflections off the louver elements. Another type of light control film includes a film or plate that has grooves or channels that are filled or coated with a light absorbing material.

SUMMARY OF THE INVENTION

The present inventors have discovered a new light control device that is relatively easy to manufacture, can be made having high aspect ratio absorbing elements, can be made to reduce ghost image formation, and that is adaptable to many different absorbing element shapes, sizes, and spacings, depending on the desired effect.

In one embodiment, the present invention provides a light control device that includes a first light transmissive film that has a first plurality of light absorbing regions extending into a surface thereof and a second light transmissive film disposed adjacent to the first light transmissive film that includes a second plurality of light absorbing regions extending into a surface thereof. The first plurality of light absorbing regions and the second plurality of light absorbing regions are relatively positioned to allow a viewer to view an image through the light control device at some viewing angles and to block viewing of the image through the light control device at other viewing angles.

In another embodiment, the present invention provides a process for making a light control device. The process includes the steps of forming a first light transmissive film that has a first plurality of indentations extending into a surface thereof, forming a second light transmissive film that has a second plurality of indentations extending into a surface thereof, rendering the first and second plurality of indentations light absorbing, and adjacently disposing the first and second light transmissive films. The light control device functions in a manner that when the light control device is positioned between an image and a viewer, the light control device is capable of allowing the viewer to view the image through the light control device within a range of viewing angles and to block viewing of the image through the light control device outside the range of viewing angles.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Figure 1:
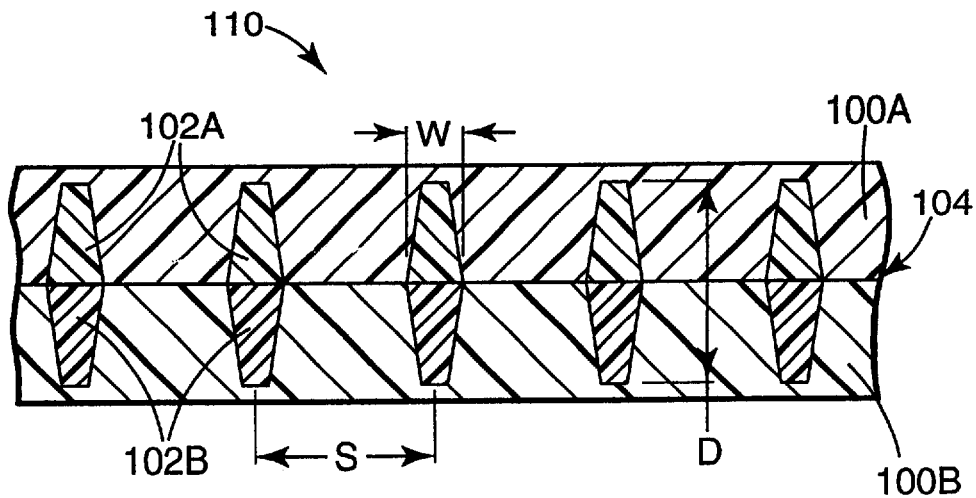
FIG. 1 is a partial schematic cross-sectional representation of a light control device.

FIG. 1 shows a cross-section of an exemplary light control device 110 according to the present invention. Light control device 110 includes a first transmissive film 100A and a second, adjacent transmissive film 100B. the transmissive films are preferably substantially transmissive of light within a desired range of wavelengths, or spectral range, such as the visible spectrum or portion thereof Transmissive films 100A and 100B can be suitably overlaid, laminated, bonded, or otherwise adjacently disposed. For example, transmissive films 100A and 100B can be bonded by use of an optically clear adhesive. Bonding methods including direct lamination, ultrasonic welding, and other suitable techniques are also contemplated. In exemplary embodiments, film 100A and film 100B are made of substantially transparent materials, and are preferably made of the same material(s) or are made of materials that have the same or nearly the same index of refraction. Likewise, if an optical adhesive or other such material is disposed between films 100A and 100B, for example to bond the films together, the material disposed between the films is preferably index matched (or nearly so) to the material(s) of the transmissive films. Matching or nearly matching indices of refraction can help to reduce reflections at the interfaces between materials, and thereby increase the overall transmission of the light control device.

Transmissive film 100A includes a plurality of light absorbing regions 102A. Light absorbing regions 102A can have any suitable shape, geometry, and dimensions, and generally extend into transmissive film 100A from one surface of the film. The light absorbing regions may be rendered light absorbing by filling the regions with a light absorbing material or coating the walls of the regions with a light absorbing material, for example. The light absorbing regions can also be formed by filling the regions or coating the walls of the regions with a light scattering or dispersing material. As such, the term "light absorbing" as used in this document to refer to regions in light control devices that are intended to substantially block the transmission of light within a desired spectral range can include materials that primarily function to absorb light and/or materials that primarily function to scatter (or disperse) light. Transmissive film 100B includes another plurality of light absorbing regions 102B. In general, light absorbing regions 102A and light absorbing regions 102B can have the same or different dimensions (heights, widths, spacings), the same or different geometries, and the same or different materials. Also, when films 100A and 100B are adjacently disposed, the positions of their respective light absorbing regions 102A and 102B can be coincident (as shown in FIG. 1), can be offset by a desired amount, or can vary between aligned and offset over different areas of the light control device.

In the embodiment shown in FIG. 1, light absorbing regions 102A and 102B are similarly shaped and similarly spaced, and transmissive films 100A and 100B are adjacently disposed so that the light absorbing regions 102A and 102B are generally aligned. Adjacent disposition of films 100A and 100B creates interface 104. Undesired reflections at interface 104 can be reduced by choosing index matched, or nearly index matched, materials for films 100A and 100B and/or for an optional adhesive or other bonding material used in the interface 104. Each pair of aligned light absorbing regions can be considered as a single light absorbing element of the overall light control device 110, the light absorbing element having a height D and a width at its widest portion W. The spacing between selected adjacent light absorbing elements can be measured by the center-to-center distance between light absorbing elements, designated S.

Light control device 110 can be placed proximate a display surface, image surface, or other such object to be viewed. At normal incidence (or 0° viewing angle) where a viewer is looking at an image through the light control device in a direction that is perpendicular to the light control device, the image is viewable, and the fraction of light from the image that is transmitted though the light control device is roughly equal to (S–W)/S (not taking into account losses due to surface reflections or other re-direction of light, whether desired or undesired), for opposing, mutually aligned light absorbing elements that have the same maximum width and same center-to-center spacing. Similar calculations can be made for light control devices that have light absorbing elements of varying size, shape, spacing, etc. However, without loss of generality and without limiting the present invention, this document may focus discussions on light control devices that have similarly shaped light absorbing elements that are regularly spaced.

As the viewing angle increases, the amount of light transmitted through the light control device from the image to the viewer decreases until a maximum viewing angle is reached where substantially all the light is blocked by the light absorbing elements and the image is no longer viewable. This can provide privacy to a viewer by blocking observation by others that are outside a typical range of viewing angles contemplated for use or viewing of the display.

Figure 2A:
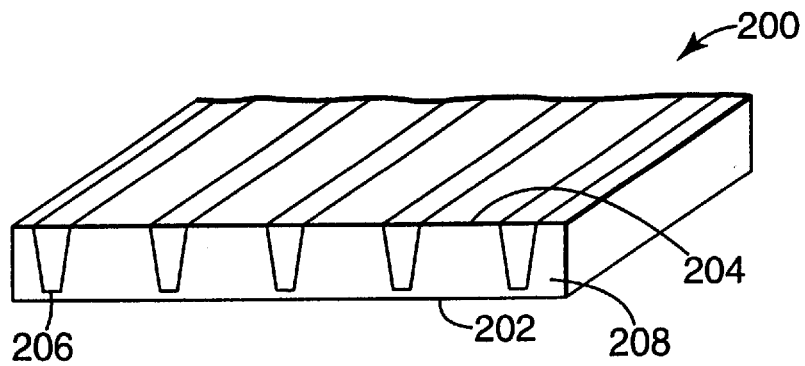
FIG. 2(a) and (b) are a partial schematic views of films that may be useful in forming light control devices.
Figure 2B:
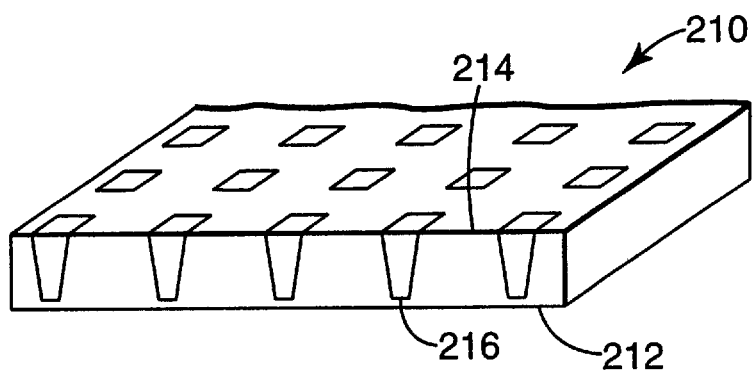

Examples of light transmissive films that include light absorbing regions are shown in FIGS. 2(a) and (b). FIG. 2(a) shows a light transmissive film 200 that includes a plurality of parallel light absorbing grooves 206. The light absorbing grooves 206 extend into film 200 from surface 204, and may or may not extend all the way through the film 200. As shown, the light absorbing grooves 206 do not extend all the way through the film 200, and the portion of film 200 between the bottoms of the light absorbing grooves 206 and the opposing surface 202 is generally referred to as the "land" 208. FIG. 2(b) shows another light transmissive film 210 that includes a plurality of light absorbing columns 216 extending into the film 210 from surface 214 toward opposing surface 212. Each of films 200 and 210 can be combined with other similar or different light transmissive films having light absorbing regions to make a light control device such as that shown in FIG. 1. Light transmissive films can be combined so that the surfaces into which the light absorbing elements extend (hereafter referred to as the "structured" surface, without regard to actual light absorbing element shape) are adjacently positioned (as in FIG. 1). Light transmissive films can also be combined so that their respective land-side surfaces (surfaces opposing the grooved surfaces) are adjacently positioned. Light transmissive films can also be combined so that the land-side surface of one film is positioned adjacent to the structured surface of the other film.

In general, it may be desirable for light control devices to exhibit a relatively high transmission over a range of viewing angles that includes normal incidence, and to exhibit a transmission that falls off relatively rapidly to zero, or nearly so, for viewing angles outside the high transmission range. Such behavior of transmission versus viewing angle allows direct viewers to view an image through the light control device with sufficient brightness throughout a selected range of viewing angles while blocking the view of onlookers. Thus, the light control device can act as a privacy filter. Blocking light at larger viewing angles can also prevent light from being directed towards reflective or potentially glare-producing surfaces, such as a nearby windshield positioned at an angle with respect to a display in a vehicle.

Figure 3:
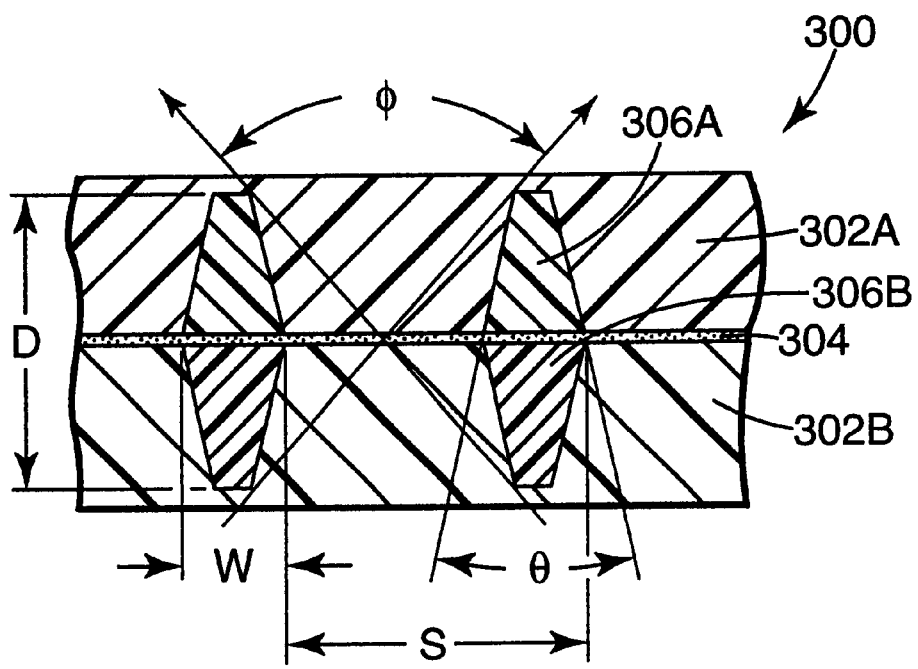
FIG. 3 is a schematic cross section of a portion of a light control device.

Light control devices of the present invention can provide many advantages. For example, higher aspect ratio absorbing elements can be made while maintaining relative ease of manufacturability and a large range of possible light absorbing element geometries. This can lead to light control devices that have high transmission over a desired range of viewing angles, a sharp cutoff in transmission for viewing angles outside of the desired range, and a reduction in ghost image formation (as discussed below). The portion of light control device 300 shown in FIG. 3 can be used to describe these effects. FIG. 3 shows light control device 300 that includes a first transmissive film 302A having a plurality of light absorbing elements 306A and a second transmissive film 302B having a corresponding plurality of light absorbing elements 306B. Light absorbing elements 306A and 306B are similarly shaped and spaced, and transmissive films 302A and 302B are bonded using optically clear adhesive 304 so that their respective light absorbing elements are mutually aligned. The light absorbing elements have an included wall angle θ, a maximum width W, an effective height D, center-to-center spacing S, and a maximum viewing range φ. The viewing range φ is about twice the maximum viewing angle. The viewing range φ can be asymmetric, for example providing a larger range of vertical viewing angles and a smaller range of horizontal viewing angles. The viewing range φ can also be asymmetric by providing a larger range of viewing angles in one direction along the horizontal, for example, than in the other direction along the horizontal, as discussed in more detail below with respect to FIG. 4.

A light control device that has a higher aspect ratio (D/W) at a smaller center-to-center spacing S can provide a sharper image viewability cutoff at lower viewing angles. For example, if D is left fixed while reducing W and S, image resolution can be enhanced at normal and near normal viewing angles while the viewing cutoff for privacy can be more abrupt. Light control devices of the present invention can be used to achieve these advantages while also reducing ghost image formation and maintaining relative ease of manufacturability. First, as noted below, it is generally easier to form relatively small aspect ratio light absorbing regions in a transmissive film than to form high aspect ratio regions. Light control devices of the present invention, however, can be made that effectively double the height of the light absorbing regions by overlaying one film on another. Two light absorbing regions can thereby be combined to form a taller light absorbing element without necessarily correspondingly increasing the width of the light absorbing element. Thus, the transmission at normal incidence can be maintained while increasing the effective aspect ratio.

Light control devices of the present invention can also be made that have relatively large included wall angles (φ in FIG. 3). The two film construction can allow light absorbing elements to be designed as shown in FIGS. 1 and 3 to make light control devices whose light absorbing elements are narrow at one end, widen to a maximum width, and then narrow again. Alternatively, the light absorbing elements may be wide at the ends and narrow in the middle, or in other such combinations. In these cases, the wall angle can be relatively large while maintaining a maximum width that allows for sufficient transmission at normal viewing angles. This can be compared to a single film construction, which typically has light absorbing elements that taper from widest at one end to narrowest at the other end. In such single film constructions, a combination of large wall angles, high aspect ratio structures, and relatively high transmission at normal viewing cannot be readily obtained as for the two film construction of the present invention. This is because, for a given maximum width, as the wall angle of the absorbing elements increases, the height and therefore the aspect ratio of the absorbing element decreases. By using a two film construction, the aspect ratio of absorbing elements can be effectively doubled at a given maximum width and wall angle.

While single film constructions might theoretically be able to be made having high aspect ratio structures by reducing the wall angle to 0° or near 0°, such small wall angles and high aspect ratio structures can be difficult to manufacturer, especially when the films are made by molding techniques where mold release can be a significant issue. In the present invention, it has also been found that larger wall angles can provide benefits in addition to ease of manufacture. One advantage of larger wall angles can be that they lead to reduced ghost image formation, or "ghosting". Ghost images occur when light from an image is incident on a light absorbing element at a glancing angle and can cause loss of display resolution and/or reduced image contrast. Larger wall angles tend to result in ghost images being observed most strongly at larger viewing angles. By properly designing the light control device, the ghost images can be pushed out to viewing angles where the overall transmission through the light control device is low, and so the ghost image does not significantly detract from viewability.

Larger wall angles can increase the maximum width of the light absorbing regions, thereby decreasing the percent transmission at normal incidence. However, an advantage of larger wall angles can be that the percent transmission remains relatively flat and uniform, only slowly decreasing with viewing angle, for near normal viewing angles (e.g., viewing angles up to about 10° or 20°, for example, depending on wall angle). This can give a viewer a more uniform display appearance throughout a typical range of viewing angles, thereby allowing the viewer more freedom of movement relative to the display. Such a light control device can still provide an abrupt cut-off to no transmission for larger viewing angles. The overall effect for a viewer can be desired off-axis privacy coupled with uniform display appearance within a typical range of viewing angles while maintaining an adequate maximum transmission.

Light transmissive films useful in light control devices of the present invention can be made of any suitable visible light transparent or transmissive material capable of being formed into a film and capable of being imparted with a plurality of light absorbing regions. Preferably, the light transmissive films are plastic films that are transmissive of visible light (or other desired spectral range), and that can be molded, cast, extruded, and/or directly machined to have a plurality of grooves or other indentations that can form light absorbing regions when filled or coated with a light absorbing material (and/or light scattering material). Other transmissive materials such as glass can also be used.

Light absorbing materials useful in forming light absorbing regions in light control devices of the present invention can be any suitable material that functions to absorb or block light at least in a portion of the visible spectrum. Preferably, the light absorbing material can be coated or otherwise disposed in grooves or indentations in a light transmissive film to form light absorbing regions in the light transmissive film. Exemplary light absorbing materials include a black or other light absorbing colorant (such as carbon black or another pigment or dye, or combinations thereof) dispersed in a suitable binder. Other light absorbing materials can include particles or other scattering elements that can function to block light from being transmitted through the light absorbing regions.

To reduce reflections at the light transmissive film/light absorbing material interface, it may be desirable to match or nearly match the index of refraction of the transmissive film material with the index of refraction of the light absorbing material over all or a portion of the visible spectrum. Reducing such reflections tends to reduce the formation of ghost images. It can often be difficult to index match materials over a significant range of wavelengths such as the entire visible spectrum, and in these cases it can be desirable to use a light absorbing material that has an index of refraction that is equal to or slightly greater than the index of refraction of the light transmissive material over the spectral range of interest (e.g., over the range of visible wavelengths).

Two light transmissive films, each having a plurality of light absorbing regions, can be combined to form a light control device of the present invention in any suitable manner. As noted above, two light transmissive films can be overlaid and bonded, for example using an adhesive, preferable an optically clear adhesive, preferably an index-matched adhesive. The light absorbing regions of the light transmissive films can be filled or coated with light absorbing materials before overlaying and bonding with other light transmissive films. Alternately, two light transmissive films can be overlaid and bonded before having their respective structured surfaces filled or coated with light absorbing materials. For example, two light transmissive films each including a similar series of parallel grooves capable of being mutually aligned can be bonded together, structured surface to structured surface, with their respective grooves aligned. The channels can then be filled, for example, with a light absorbing material.

When alignment of light absorption elements is desired, grooves or tabs can be used to aid alignment. Alignment can be gauged, for example, by monitoring two or more locations across the films for alignment of the light absorption elements. Alternatively or additionally, rotational and/or translational alignment can be monitored by the presence or absence of moiré fringes, whose presence indicates a misalignment of the film structures. Further, one or both of the structured films can be stretched in one or more directions to promote more precise alignment of the structures.

Figure 4:
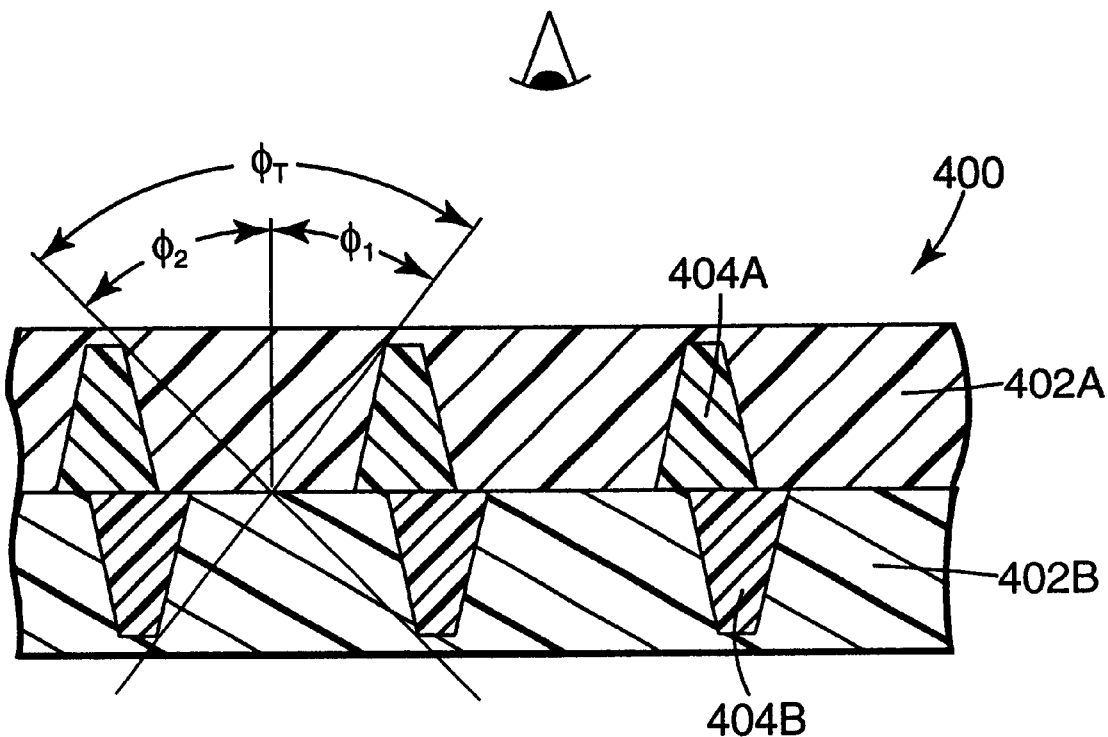
FIG. 4 is a schematic cross section of a portion of a light control device.

In addition to the light control devices that include two transmissive films having mutually aligned and registered light absorbing elements, as mentioned above the present invention contemplates other embodiments. FIG. 4 shows a light control device 400 that includes a first transmissive film 402A that includes a first plurality of light absorbing elements 404A and a second transmissive film 402B that includes a second plurality of light absorbing elements 404B. The sets of light absorbing elements 404A and 404B are skewed from perfect registration so that they partially overlap. In this way, it is possible to make a light control device that has adequate transmission at normal and near normal viewing angles and that has a viewing angle asymmetry within the same viewing plane. To illustrate, FIG. 4 shows lines representing the viewing angle cut-off points between sets of neighboring light absorbing elements. As can be seen, the total angular viewing range in the plane of the drawing is given by $\phi_T$, which is the sum of $\phi_1$ and $\phi_2$ Because the sets of light absorbing elements are skewed, $\phi_1$ is less than $\phi_2$, resulting in a viewing asymmetry that depends on the viewing direction in the plane of the drawing. Such asymmetries might be desirable for applications where it is desirable to be able to view a display a larger viewing angles along one direction, but privacy is desired in the opposite direction. For example, in personal digital assistant or cell phone displays, typical viewing may occur at off-normal angles because the display is usually held tilted slightly away from the viewer. In this case, it may be desirable to have a light control device that allows a larger viewing angle for tilt toward the viewer and a privacy cut off at smaller viewing angles away from the viewer.

Misalignment and/or misregistration of light absorbing structures may be desired for other purposes as well. For example, misaligned structures can provide a moiré pattern that is desirable in decorative display applications. Alternatively, or additionally, colorants and/or wavelength dependent scattering particles can be added in a light transmissive film or light absorbing regions of a light control device of the present invention to add other desirable visual effects, which effects can be uniform or changing depending on viewing angle.

EXAMPLES

Objects and advantages of this invention are further illustrated by the following examples, but the particular materials and amounts thereof recited in these examples, as well as other conditions and details, should not be construed to unduly limit this invention.

Example 1

Structured films were made by molding and ultraviolet light (uv) curing urethane acrylate on PET substrates. The resulting structure in the urethane acrylate was a series of evenly spaced channels, each having a nominally rectangular cross-section. The channels were about 100 microns wide, about 185 microns deep, and spaced at about a 220 micron pitch. Two sheets of these structured films were laminated together, structured surface to structured surface. The channels of each sheet were mutually aligned, and the sheets were laminated together using a thin layer of cyanoacrylate glue applied to the structured surface of one of the sheets. After the glue dried, the channels were filled with a carbon black loaded acrylate resin. Vacuum suction was used to help pull the carbon black loaded resin through the channels and fill them up. The black loaded resin was then uv cured.

The resulting light control device was similar to that shown in FIG. 1.

Example 2

A black light absorbing resin mixture was made according to the formulation given in Table I.

TABLE I

Light Absorbing Resin Mixture

| Material | Parts by Weight |
| --- | --- |
| acrylate-based dental resin (available from Minnesota Mining and Manufacturing Company under the trade designation Z-100) | 100 |
| titaniuin dioxide, heavy grade | 6.99 |
| phosphate propoxylalkyl polyol dispersant | 0.09 |
| cure initiator (available from Ciba Specialty Chemicals under the trade designation Irgacure 819) | 0.03 |
| black pigment (available from Penn Color under the trade designation 9B421) | 0.50 |

The mixture was laminated between a sheet of the structured film described in Example 1 and a plate of soda-lime glass. The plate of soda-lime glass had been previously primed with a silane coupling agent primer sold by Minnesota Mining and Manufacturing under the trade designation ScotchBond. During the process of lamination, the channels in the microreplicated film became filled with the slurry. The slurry was then hardened by curing using a blue light source. The structured film was then delaminated from the glass. Upon delaminating, the cured light absorbing material in the channels of the structured sheet remained in the channels whereas the remaining cured light absorbing material remained on the glass, separating cleanly from the structured film. The same procedure was performed using another sheet of the structured film.

The two sheets of structured film having channels filled with light absorbing material were bonded together, structure side to structure side, using the same cyanoacrylate glue used in Example 1, to produce a light control device similar to that depicted in FIG. 1.

Example 3

Structured films were made by molding and uv curing urethane acrylate on PET substrates. The resulting structure in the urethane acrylate was a series of evenly spaced channels, each having a nominally rectangular cross-section. The channels were about 30 microns wide, about 80 microns deep, and spaced at about a 100 micron pitch. The linear channels were then filled with a carbon black loaded urethane acrylate and cured with uv radiation. The formulation of the black filling resin used is reported in Table II.

TABLE II

Carbon Black Loaded Urethane Acrylate Formulation

| Material | Weight % |
| --- | --- |
| urethane acrylate (available from Henkel Corp. under the trade designation Urethane Acrylate 6210) | 70.0 |
| tetrahydrofurfuryl acrylate (available from Sartomer Company, Inc. under the trade designation SR-285) | 17.0 |
| cure initiator (available from Ciba Specialiy Chemicals under the trade designation Irgacure 819) | 1.0 |
| cure iaitiator (available from Ciba Specialty Chemicals under the trade designation Darocur 1173) | 1.0 |
| cure initiator (available from Ciba Specialty Chemicals under the trade designation Irgacure 369) | 1.0 |
| black pigment (20 wt.% carbon black in propoxylated neopentylglycol diacrylate) | 10.0 |

Two sheets of the carbon black filled structured films were laminated together, structured surface to structured surface, with the black filled channels of each sheet mutually aligned. The sheets were laminated together using a thin layer of cyanoacrylate glue applied to the urethane acrylate surface of one of the sheets. The resulting light control device was similar to that shown in FIG. 1.

Example 4

Figure 5:
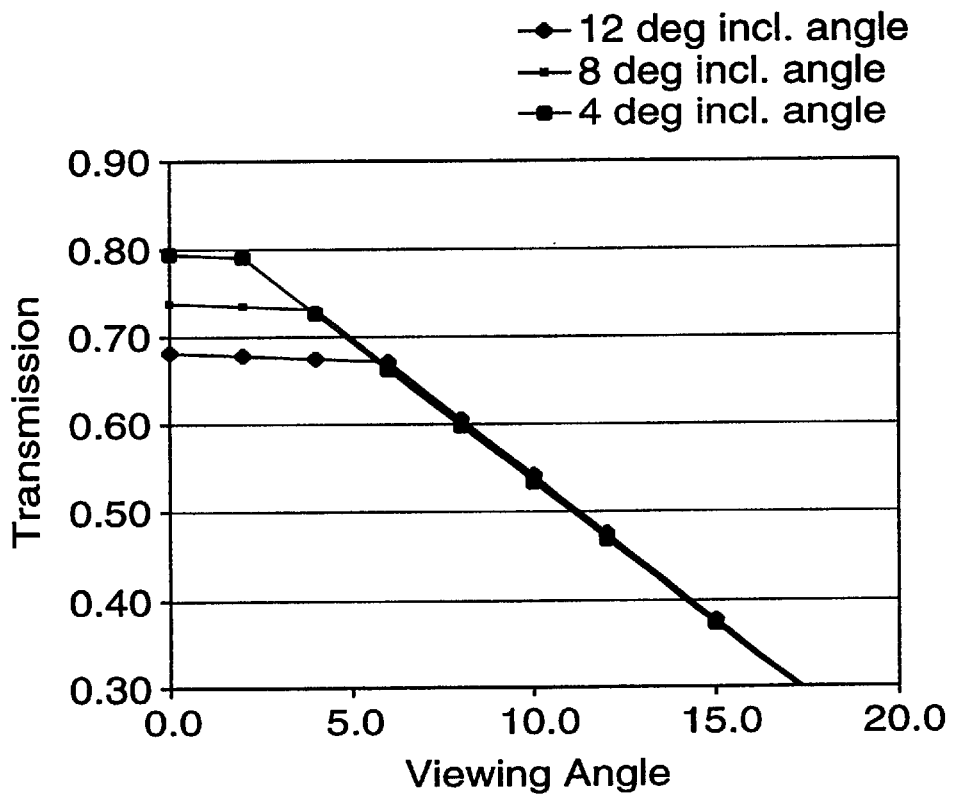
FIG. 5 is a plot representing first order model calculations of percent transmission versus viewing angle for a light control device as shown in FIG. 3 for various wall angles (represented by θ in FIG. 3)

The included angle, θ, of the light control device as shown in FIG. 3 may be varied to effectively control the transmission viewing spectrum. FIG. 5 represents model calculation results of transmitted light versus viewing angle for a light control device that could be made by any of the previously described methods. As the included angle (or wall angle) is increased, the overall percentage of transmitted light at normal incidence is decreased. However, the rate of change in transmitted light with respect to viewing angle is lessened as the included angle is increased. This latter effect can be important, taking into consideration that for larger wall angles, small changes in viewing angle at or near normal viewing will not drastically alter the perceived transmission of light through the light control device. This can lead to a more uniform display appearance throughout a typical range of viewing angles.

Example 5

The included angle, θ, of the light control device (see FIG. 3) may be varied to effectively control the viewing angle at which the maximum surface reflection off of a louver occurs (e.g., due to Fresnel reflection). If the refractive index of the light absorbing element (306A and 306B in FIG. 3) is greater than the refractive index of the light transmitting element (302A and 302B in FIG. 3) then the Fresnel equations teach that the maximum reflection at a louver surface should occur at a grazing angle of incidence with respect to the louver interface. By introducing a non-zero included angle (i.e., θ>0 degrees), the maximum surface reflection can be shifted further away from normal viewing by an angular displacement equal to about θ/2. Resulting ghost images can thus be shifted to viewing angles that are greater than and farther removed from the intended range of viewing angles.

Example 6

A model ray trace calculation was made to show the effect of wall curvature on the reflected ghost image. In these calculations, flat walls (i.e., constant θ) were replaced with sections from a cylinder. By varying one of the angles of the cylinder with respect to the other angle, it is possible to change the radius of curvature of the wall between transmitting and absorbing elements. For the calculations reported in this example, the radius of curvature of the wall was varied from infinity (flat wall case where both angles are the same) to a finite radius corresponding to a concave interface (as viewed from the transmitting element side) between the transmitting and absorbing sections, Intensities of the reflected components were tabulated as a function of cylindrical angle (higher angle corresponds to a lower radius of curvature), and are reported in Table III.

TABLE III

| Reflected component vs. radius of curvature. | | | | |
| --- | --- | --- | --- | --- |
| Angle (degrees) | 4 | 8 | 12 | 16 |
| Peak Intensity | 8.1 | 7.3 | 6.8 | 6.2 |
| Integrated Intensity | 0.44 | 0.27 | 0.16 | 0.09 |

Table III indicates that by introducing a curved feature to the interface between transmitting and absorbing sections, both the peak maximum and the overall intensity of the reflected component (or ghost image) can be reduced.

Example 7

A two-film laminate was prepared according to Example 3 and was tested for viewing angle cut-off The two-film laminate tested in this example had an 8° included angle (θ in FIG. 3). Transmittance versus viewing angle was measured using a "home-built" viewing angle tester. The tester consisted of a diff-use white light source (Oriel 50 W Quartz Tungsten Halogen lamp with a stabilized power supply), a photometer (EG&G Electro-optics Model 450 photometer with photometric filter and a 2.5° field of view aperture), and a rotating stage sample holder. Table IV represents a tabulation of experimentally measured transmittances as a function of viewing angle for two situations: (1) no film sample on the stage and (2) the two-film laminate prepared according to Example 3.

TABLE IV

| Transmission vs. viewing angle. | | |
| --- | --- | --- |
| Viewing Angle (degrees) | Transmittance without film (arbitrary units) | Transmittance with two-film laminate (arbitrary units) |
| 0 | 591 | 320 |
| 2 | 590 | 316 |
| 4 | 589 | 310 |
| 5 | 588 | 307 |
| 10 | 582 | 279 |
| 15 | 572 | 237 |
| 20 | 560 | 193 |
| 25 | 543 | 148 |
| 30 | 523 | 104 |
| 35 | 500 | 61 |
| 40 | 474 | 24 |
| 45 | 444 | 5 |

Figure 6:
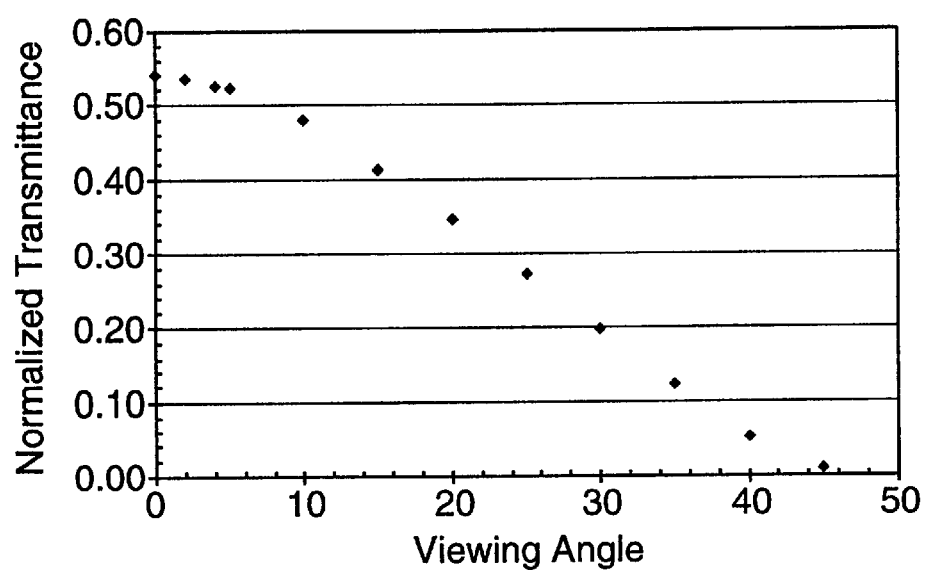
FIG. 6 is a plot of transmittance versus viewing angle for the light control device made and measured according to Example 7.

FIG. 6 is a graphical representation of the data tabulated in Table IV. The results indicate that the light control film sample exhibited little change in transmittance at angles less than 4°. This was consistent with model calculation predictions as decribed in Example 4. At viewing angles greater than 4°, the drop-off in transmission with viewing angle was nearly linear. This linear relationship was also consistent with model calculation predictions.

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A light control device comprising:
   a first light transmissive film comprising a first plurality of light absorbing regions extending into a surface thereof; and
   a second light transmissive film disposed adjacent the first light transmissive film and comprising a second plurality of light absorbing regions extending into a surface thereof,
   wherein the first plurality of light absorbing regions and the second plurality of light absorbing regions are relatively positioned to allow a viewer to view an image through the light control device within a range of viewing angles and to block viewing of the image through the light control device outside the range of viewing angles.

2. The light control device of claim 1, wherein the first plurality of light absorbing regions comprises a plurality of grooves.

3. The light control device of claim 1, wherein the first and second plurality of light absorbing regions each comprise a plurality of grooves.

4. The light control device of claim 3, wherein the first and second plurality of light absorbing regions are mutually aligned.

5. The light control device of claim 1, wherein the first and second light transmissive films are substantially refractive index matched.

6. The light control device of claim 1, wherein the first and second light transmissive films are laminated together.

7. The light control device of claim 1, wherein the first and second light transmissive films are bonded together using an optical adhesive.

8. The light control device of claim 1, wherein the first plurality of light absorbing regions exhibit a refractive index that is about the same or greater than the refractive index of the first light transmissive film throughout a range of wavelengths in the visible spectrum.

9. The light control device of claim 1, wherein the first plurality of light absorbing regions exhibit wall angles greater than 5°.

10. The light control device of claim 1, wherein the first plurality of light absorbing regions exhibit curved walls.

11. A process for making a light control device comprising the steps of:

forming a first light transmissive film having a first plurality of indentations extending into a surface thereof;

forming a second light transmissive film having a second plurality of indentations extending into a surface thereof;

rendering the first and second plurality of indentations light absorbing; and adjacently disposing the first and second light transmissive films, wherein when the light control device is positioned between an image and a viewer, the light control device is capable of allowing the viewer to view the image through the light control device within a range of viewing angles and to block viewing of the image through the light control device outside the range of viewing angles.

12. The process of claim 11, wherein the first and second plurality of indentations comprises a plurality of parallel grooves.

13. The process of claim 12, further comprising the step of mutually aligning the first and second plurality of indentations.

14. The process of claim 11, wherein the step of rendering the first and second plurality of indentations light absorbing comprises filling the first and second plurality of indentations with a visible light absorbing material.

15. The process of claim 11, wherein the step of adjacently disposing the first and second light transmissive films comprises laminating the first and second light transmissive films together.

16. The process of claim 15, wherein laminating is performed using an optical adhesive.

17. The process of claim 11, wherein the step of rendering the first and second plurality of indentations light absorbing is performed before the step of adjacently disposing the first and second light transmissive films.

18. The process of claim 11, wherein the step of rendering the first and second plurality of indentations light absorbing is performed after the step of adjacently disposing the first and second light transmissive films.

* * * * *

UNITED STATES PATENT AND TRADEMARK OFFICE
CERTIFICATE OF CORRECTION

PATENT NO.     : 6,398,370 B1
DATED          : June 4, 2002
INVENTOR(S)    : Chiu, Raymond C.

It is certified that error appears in the above-identified patent and that said Letters Patent is hereby corrected as shown below:

Column 1,
Line 14, delete "withRela" and insert in place thereof -- with rela --.

Column 2,
Line 23, delete "thereof Transmissive" and insert in place thereof -- thereof. Transmissive --.

Column 5,
Line 2, delete "φ" and insert in place thereof -- θ --.

Column 8,
Line 57, delete "iaitiator" and insert in place thereof -- initiator --.

Column 10,
Line 5, insert -- . -- following "cut-off".
Line 9, delete "diff-use" and insert in place thereof -- diffuse --.

Signed and Sealed this

Twenty-fifth Day of February, 2003

JAMES E. ROGAN
*Director of the United States Patent and Trademark Office*